(12) United States Patent
Johnson et al.

(10) Patent No.: US 6,795,250 B2
(45) Date of Patent: Sep. 21, 2004

(54) LENTICULAR LENS ARRAY

(75) Inventors: Ralph Barry Johnson, Huntsville, AL (US); Gary A. Jacobsen, Itasca, IL (US)

(73) Assignee: LentiClear Lenticular Lens, Inc., Itasca, IL (US)

( * ) Notice: Subject to any disclaimer, the term of this patent is extended or adjusted under 35 U.S.C. 154(b) by 34 days.

(21) Appl. No.: 10/167,020

(22) Filed: Jun. 10, 2002

(65) Prior Publication Data

US 2003/0002160 A1 Jan. 2, 2003

Related U.S. Application Data

(60) Provisional application No. 60/258,931, filed on Dec. 29, 2000, and provisional application No. 60/297,148, filed on Jun. 8, 2001.

(51) Int. Cl.⁷ .............................................. G02B 27/10
(52) U.S. Cl. ....................................... 359/626; 359/619
(58) Field of Search ................................ 359/619, 621, 359/622, 625, 626; 40/454

(56) References Cited

U.S. PATENT DOCUMENTS

| | | | |
|---|---|---|---|
| 2,832,593 A | * | 4/1958 | Anderson ...................... 472/70 |
| 3,740,127 A | * | 6/1973 | Baker et al. ................... 352/72 |
| 3,984,242 A | * | 10/1976 | Lamberts et al. .............. 430/6 |
| 4,306,278 A | | 12/1981 | Fulton et al. |
| 4,414,316 A | | 11/1983 | Conley |
| 4,420,502 A | | 12/1983 | Conley |
| 4,420,527 A | | 12/1983 | Conley |
| 4,953,948 A | * | 9/1990 | Ito et al. ....................... 359/460 |
| 5,113,213 A | | 5/1992 | Sandor et al. |
| 5,266,995 A | | 11/1993 | Quadracci et al. |
| 5,285,238 A | | 2/1994 | Quadracci et al. |
| 5,362,351 A | | 11/1994 | Karszes |
| 5,457,515 A | | 10/1995 | Quadracci et al. |
| 5,488,451 A | | 1/1996 | Goggins |
| 5,560,799 A | | 10/1996 | Jacobsen |
| 5,617,178 A | | 4/1997 | Goggins |
| 5,642,226 A | * | 6/1997 | Rosenthal ..................... 359/619 |
| 5,687,024 A | | 11/1997 | Yoshimura et al. |
| 5,724,188 A | | 3/1998 | Kumagai et al. |
| 5,753,344 A | | 5/1998 | Jacobsen |
| 5,847,808 A | | 12/1998 | Goggins |
| 5,896,230 A | | 4/1999 | Goggins |
| 5,933,276 A | | 8/1999 | Magee |
| 5,967,032 A | | 10/1999 | Bravenec et al. |
| 5,974,967 A | | 11/1999 | Bravenec et al. |
| 6,046,855 A | | 4/2000 | Goto |
| 6,060,003 A | | 5/2000 | Karszes |
| 6,073,854 A | | 6/2000 | Bravenec et al. |
| 6,074,192 A | | 6/2000 | Mikkelsen |
| 6,084,713 A | | 7/2000 | Rosenthal |
| D429,895 S | | 8/2000 | Bravenec et al. |
| 6,157,491 A | * | 12/2000 | Watanabe et al. ............ 359/619 |
| 6,256,150 B1 | | 7/2001 | Rosenthal |
| 6,405,464 B1 | | 6/2002 | Gulick, Jr. et al. |
| 6,414,794 B1 | | 7/2002 | Rosenthal |
| 6,424,467 B1 | | 7/2002 | Goggins |
| 6,490,092 B1 | | 12/2002 | Goggins |
| 6,490,093 B2 | | 12/2002 | Guest |
| 6,721,101 B2 | * | 4/2004 | Daniell ......................... 359/626 |

* cited by examiner

*Primary Examiner*—Ricky Mack
(74) *Attorney, Agent, or Firm*—King & Spalding LLP

(57) ABSTRACT

A lenticular lens array for creating a visual effect for an image viewed through the lenticular lens array comprises a plurality of lenticules disposed adjacent to each other. Each lenticule comprises a lenticular lens element on one side and a substantially flat surface on an opposite side. Each lenticular lens element has a vertex and a cross section comprising a portion of an elliptical shape. Alternatively, the cross section can comprise an approximated portion of an elliptical shape. The elliptical shape comprises a major axis disposed substantially perpendicular to the substantially flat surface of each respective lenticular lens element. The vertex of each respective lenticular lens element lies substantially along the major axis of the elliptical shape.

75 Claims, 10 Drawing Sheets

Conventional Figure 1

Conventional Figure 2

Conventional Figure 3

LENTICULAR LENS ARRAY

PRIORITY AND RELATED APPLICATIONS

This application claims the benefit of priority to U.S. Provisional Patent Application Serial No. 60/297,148, entitled "Lenticular Lens Array Optimization for Printed Display," filed Jun. 8, 2001. The complete disclosure of the above-identified priority application is fully incorporated herein by reference.

FIELD OF THE INVENTION

The present invention relates generally to a lenticular lens array for producing visual effects from interdigitated or interlaced images. More particularly, the present invention relates to a lenticular lens array where a cross section of each lens element on the array comprises an elliptical shape. The present invention also relates to a tool and a method for creating such a lenticular lens array.

BACKGROUND OF THE INVENTION

A lenticular lens can create visual animated effects for interdigitated or interlaced (hereinafter "interlaced") printed images. The images can be printed using non-impact printing, known as masterless printing, or by conventional printing processes, known as master printing. Typically, a lenticular lens application comprises two major components: an extruded, cast, or embossed plastic lenticular lens and the interlaced printed image. The front of the lenticular lens comprises a plurality of lenticules arranged in a regular array, having cylindrical lens elements running parallel to one another. The back of the lenticular lens is flat and smooth. The interlaced images are printed on the flat, smooth backside of the lenticular lens. Exemplary methods for printing the images include conventional printing methods such as screen, letterpress, flexographic, offset lithography, and gravure; and non-impact printing methods such as electro-photography, iconography, magnetography, ink jet, thermography, and photographic. Any of the above printing technologies can be used in either sheet-fed or roll web-fed forms.

The interlaced images are viewed individually, depending on the angle through which a viewer observes the images through the lenticular lens elements. At a first viewing angle, a first image appears through the lenticular lens elements. As the lenticular lens is rotated, the first image disappears and another image appears through the lenticular lens elements. Viewing the images through the lenticular lens elements can create the illusion of motion, depth, and other visual effects. A lenticular lens can create those illusions through different visual effects. For example, the visual effects can comprise three-dimensions (3-D), animation or motion, flip, morph, zoom, or combinations thereof.

For a 3-D effect, multiple layers of different visual elements are interlaced together to create the illusion of 3-D, distance, and depth. For example, background objects are pictured with foreground objects that appear to protrude when viewed through a straight forward, non-angled view. For an animation or motion effect, a series of sequential photos can create the illusion of animated images. A viewer observes the series of photos as the viewing angle of the lens changes. Animation is effective in showing mechanical movement, body movement, or products in use.

For a flip visual effect, two or more images flip back and forth as the viewing angle changes. The flip effect can show before-and-after and cause-and-effect scenarios. It also can show bilingual messages, such as flipping from English to Spanish. For a morph visual effect, two or more unrelated images gradually transform or morph into one another as the viewing angle of the lenticular lens changes. Finally, for a zoom effect, an object moves from the background into the foreground as the viewing angle of the lenticular lens changes. The object also may travel from side to side, but usually works better in a top to bottom format.

FIG. 1 illustrates a partial cross section of a conventional lenticular lens array 100. The array 100 comprises lenticules 102, 104, 106. Each lenticule 102, 104, 106 comprises a cylindrical lens element 102a, 104a, 106a, respectively. Each lens element 102a, 104a, 106a operates to focus light on a back surface 107 of the array 100. In operation of the conventional array 100, multiple images can be printed on the rear surface 107. An observer can singularly view the images through the lens elements 102a, 104a, 106a by rotating the array 100.

Specific characteristics of each lenticule 102, 104, 106 will be described with reference to exemplary lenticule 104. Each lens element 102a, 104a, 106a has a circular cross section of radius R. The circular cross section corresponds to a desired circular shape 108 having the radius R. The lens element 104a comprises a portion of the circular shape 108. Lenticule 104 also has a distance t from a vertex of the lens element 104a to the rear surface 107 of the array 100. The lens element 104a has a lens junction depth d where it joins adjacent lens elements 102a, 106a. Finally, the material forming the lens array 100 determines a refractive index N of the array 100.

The relationship between the distance t, the radius R, and the refractive index N is given by the following equation:

$$t = \frac{RN}{N-1} \quad (1)$$

As shown in equation (1), the thickness t and radius R are a function of the refractive index N, which is a function of wavelength of light. Accordingly, the lenticular lens elements can be optimized for a particular wavelength based on the wavelength that provides the best overall performance for the desired application.

Regularity of the array 100 can be defined by the separation or distance S between the vertex of adjacent lens elements. For the conventional cylindrical lenticular lens array 100, the maximum separation between the vertex of each lens element 102a, 104a, 106a is given by the following equation:

$$S_{max} = 2R \quad (2)$$

A pitch P of the lenticules can be defined as a number of lenticules per unit length (lpu). For example, the unit length can comprise an inch or a millimeter. For the conventional cylindrical lenticular lens array 100, the minimum pitch is given by the following equation:

$$P_{min} = \frac{1}{2R}[lpu] \quad (3)$$

FIG. 2 illustrates a light ray trace illustrating several problems associated with a conventional lenticular lens array 100. In general, the array 100 operates by passing light from the rear surface 107 through the lens elements 102a, 104a, 106a to an observer. Reciprocity allows viewing the light path in reverse as illustrated in FIG. 2. Ideally, on-axis light $L_1$ passes through lens element 104a and is focused to a common point 202 on the rear surface 107 of the array 100. However, the circular cross-section of the lens element 104a produces a projected image having spherical aberration. For example, the light $L_1$ is projected over a large area 204 on the rear surface 107. The large projection area limits resolution and the number of interlaced images that can be viewed on the rear surface 107.

Additionally, off-axis light $L_2$ passes through the lens element 104a and is focused upon the rear surface 107 near point 203. However, the circular cross-section of lens element 104a produces coma and an astigmatic aberration 208. Finally, FIG. 2 illustrates that the depth d of the lens surface can approach the radius of the circular cross-section at the junction of adjacent lenses. Accordingly, portions of the light $L_2$ are blocked by lens 106a and may be redirected to the wrong location 206.

FIG. 3 illustrates a light beam projection illustrating another problem associated with the conventional lenticular lens array 100. FIG. 3 illustrates light beams projected to an observer from different printed areas of the conventional lenticular lens array 100. As shown, the light beams in the central area 302 are not reasonably matched over the circular angle of the lens.

Furthermore, conventional lenticular sheet-fed printing has been used to create promotional printed advertising pieces printed on a lenticular lens array. For example, the advertising pieces include limited volumes of thicker gauge lenticular material designs such as buttons, signage, hang tags for clothing, point-of-purchase displays, postcards, greeting cards, telephone cards, trading cards, credit cards, and the like. Those thicker gauge lenticular printed products are printed on cylindrical lenticular material having a standard thickness. For example, standard thicknesses include 0.012 mil, 0.014 mil, 0.016 mil, 0.018 mil, and up to 0.0900 mil. Printed quality on those thicker lenses are generally acceptable because the lenticule pitch is more course (fewer lenticules) and the printing process can place more printed image pixels within the lenticule band range. Additionally, lenticular materials at the thicker ranges tend to be more optically forgiving then thinner gauges.

Recently, lenticular extruders, lenticular casting/embossers, and print manufacturers have experimented with decreasing the overall lenticular material thickness using the common cylindrical lens elements discussed above. However, as the thickness of the lenticular lens array decreases, the print quality suffers significant aberration. As the thickness decreases, lenticule pitch must increase to provide more lenticules per unit length, thereby reducing the separation between lenticules. That thinner configuration does not allow using as many printed pixel images when compared to the thicker lenticular material designs. Accordingly, the quality of the printed visual effects is degraded with the thinner material.

Another problem with thicker lenticular materials is that the thicker materials cannot be used for the majority of the consumer packaging industry. That problem arises because thicker materials of 0.012 mil and thicker cannot be applied nor handled properly to cylindrical or truncated package shapes without de-laminating off the package due to plastic memory pull. Even when a strong adhesive is used to bond the thick lenticular piece to the packaged unit, problems with de-lamination still occur over time due to the continual pull of the plastic material, as the plastic memory pulls the material to its natural, straight produced shape.

Thicker lenticular materials also experience problems during the label application process. Automated printed label blow-down or wipe-down packaging labeling equipment cannot apply the thicker lenticular materials, because of the plastic memory issues discussed above. The plastic memory causes the thicker lenticular die cut labels to rise off the lenticular label rolls before the application process.

Therefore, a need in the art exists for a lenticular lens array that can provide a more focused or resolved image by mitigating the spherical aberration associated with conventional arrays. A need in the art also exists for a tool and a method for making such a lenticular lens array. Furthermore, a need exists in the art for a lenticular lens array having a lenticular lens element shaped to mitigate the spherical aberration associated with conventional lenticular lens elements. A need also exists for a lenticular lens array having a thin structure to mitigate plastic memory issues associated with thicker, conventional arrays.

SUMMARY OF THE INVENTION

The present invention can provide a lenticular lens array that can optimize printed display quality of animated/three-dimensional images for mass production. The present invention can provide a lenticular lens array that can mitigate the spherical aberration typically produced by a conventional array. For example, the present invention can provide a lenticular lens array that can produce a substantially focused axial image and can improve the off-axis image. Additionally, the present invention can provide a lenticular lens array having a reduced lens junction depth, which can mitigate off-axis light blocking by adjacent lenses.

The lenticular lens array according to the present invention can comprise a plurality of lenticules disposed adjacent to each other. Each lenticule can comprise a lenticular lens element on one side and a substantially flat surface on an opposite side. Each lenticular lens element can have a vertex and a cross section comprising a portion of an elliptical shape. Alternatively, the cross section can comprise an approximated portion of an elliptical shape. The elliptical shape can comprise a major axis disposed substantially perpendicular to the substantially flat surface of each respective lenticular lens element. The vertex of each respective lenticular lens element can lie substantially along the major axis of the elliptical shape.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The present invention can reduce spherical aberration associated with conventional lenticular lens arrays by providing a lenticular lens array having an elliptical cross-sectional shape. The elliptical cross-sectional shape can provide sharp focusing of on-axis light and can increase the clarity of off-axis light. The characteristic shape of the elliptical cross section can be determined based on a particular application. Many parameters can influence the elliptical shape. For example, the parameters include a refractive index N of the array material, a thickness t from the vertex of each lens element to a rear surface of the array, a lens junction depth d where adjacent lenses join, and other parameters. A pseudo elliptical lens element also can provide a lenticular lens array having reduced spherical aberration.

Figure 1:
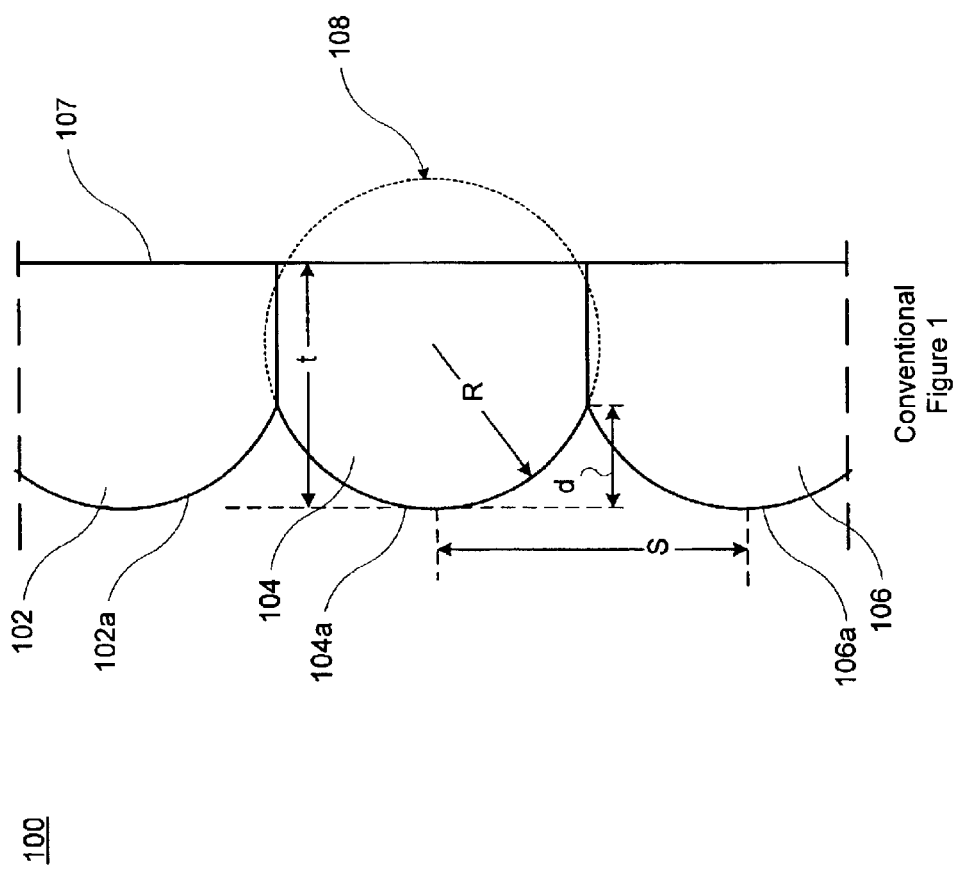
FIG. 1 illustrates a partial cross section of a conventional lenticular lens array.
Figure 2:
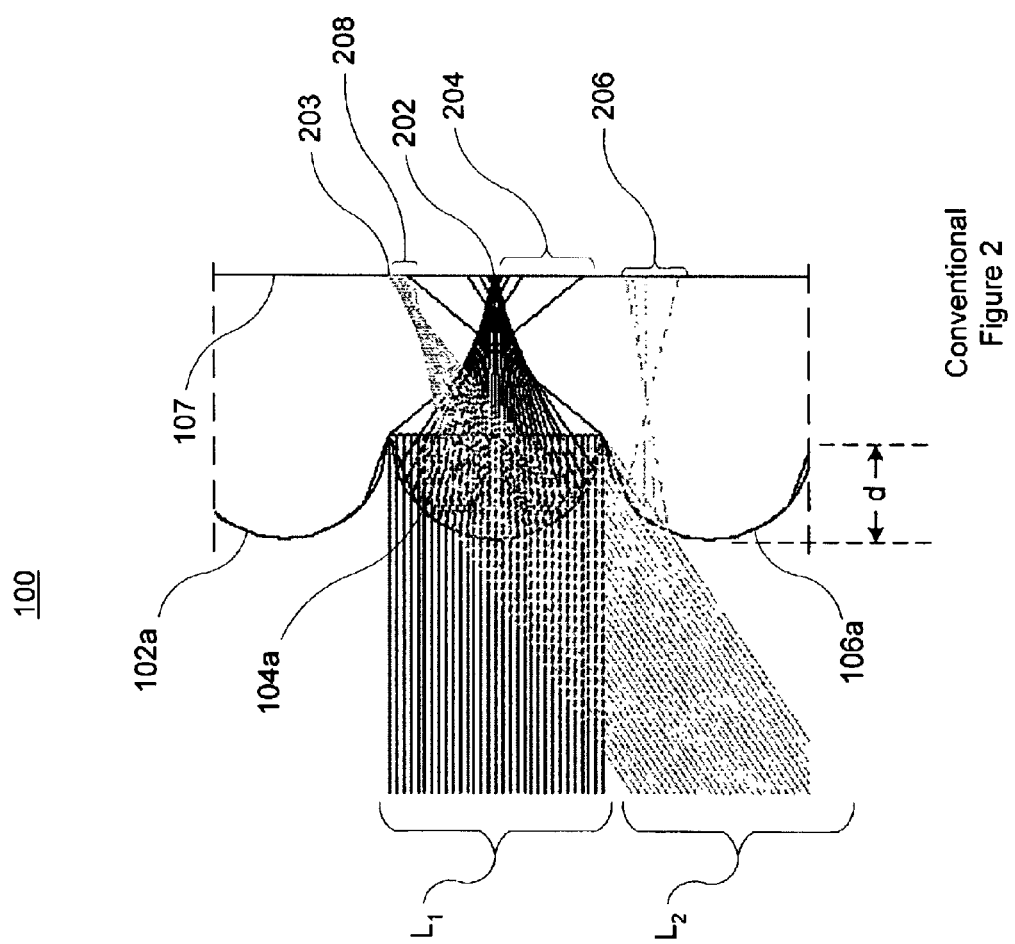
FIG. 2 illustrates a light ray trace illustrating problems associated with a conventional lenticular lens array.
Figure 3:
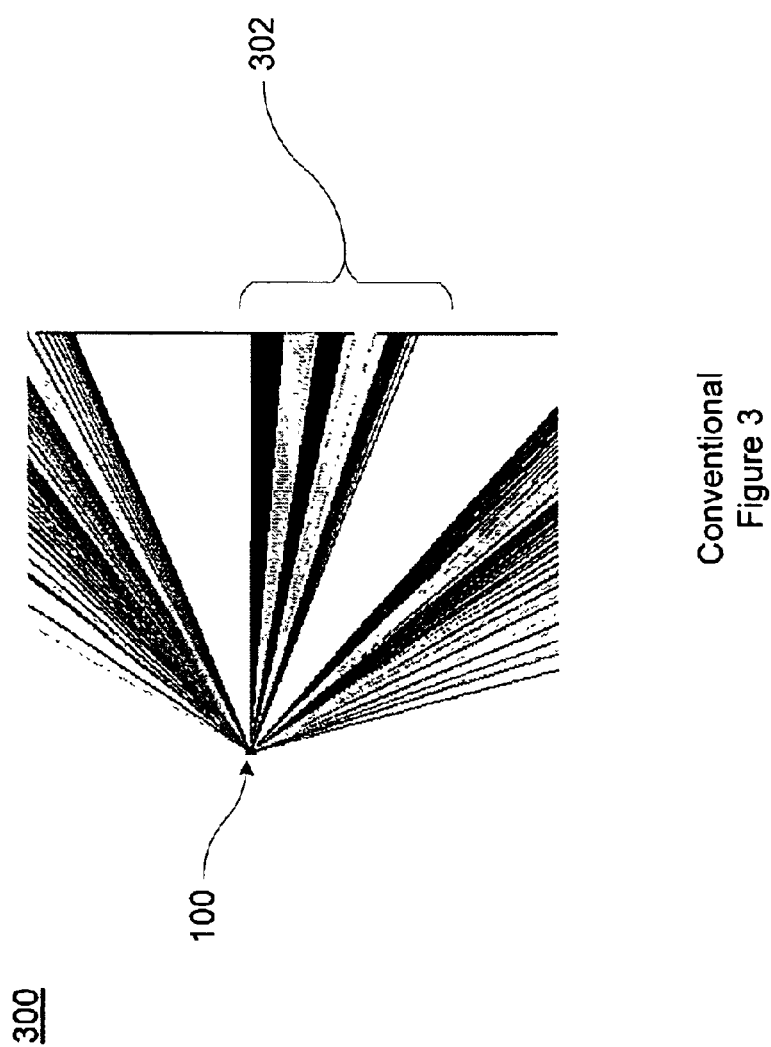
FIG. 3 illustrates a light beam projection illustrating another problem associated with the conventional lenticular lens array.
Figure 4:
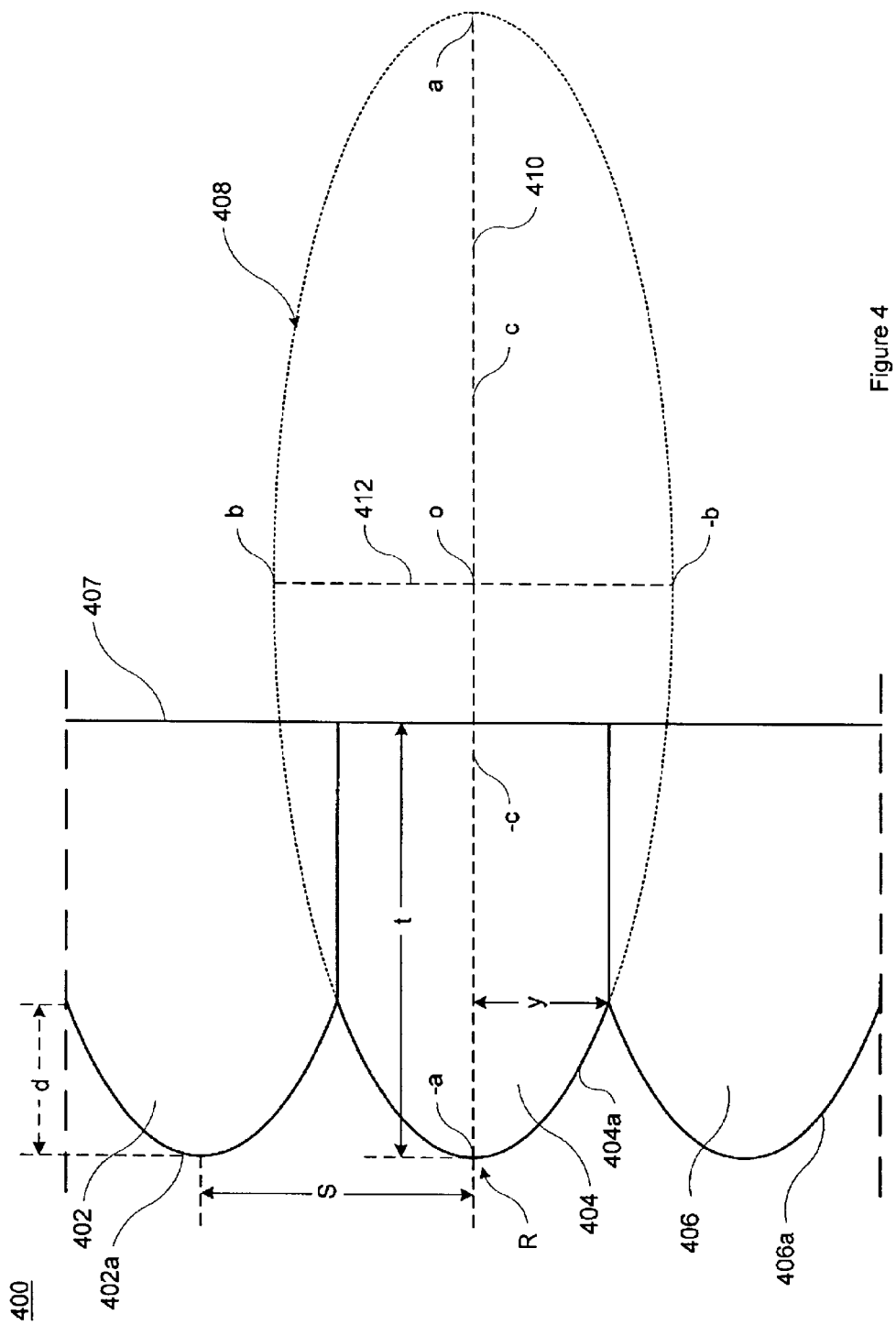
FIG. 4 illustrates a partial cross section of a lenticular lens array according to an exemplary embodiment of the present invention.

FIG. 4 illustrates a partial cross section of a lenticular lens array 400 according to an exemplary embodiment of the present invention. The array 400 comprises lenticules 402, 404, 406. Each lenticule 402, 404, 406 comprises an elliptically-shaped lens element 402a, 404a, 406a, respectively. Each lens element 402a, 404a, 406a operates to focus light on a back surface 407 of the array 400. In operation of the array 400, multiple images can be printed on the rear surface 407 of the array 400. An observer can singularly view the images through the lens elements 402a, 404a, 406a by rotating the array 400.

Specific characteristics of each lenticule 402, 404, 406 will be described with reference to exemplary lenticule 404. Each lens element 402a, 404a, 406a has an elliptical cross section corresponding to a portion of a desired elliptical shape 408. The lens element 404a comprises a portion of the elliptical shape 408. At a vertex of the lens element 404a, the elliptical shape 408 has a radius R. Lenticule 404 also has a distance t from a vertex of the lens element 404a to the rear surface 407 of the array 400. The lens element 404a has a lens junction depth d where it joins adjacent lens elements 402a, 406a. The material forming the lens array 400 determines a refractive index N of the array 400. The relationship between the distance t, the radius R, and the refractive index N is given by equation (1) discussed above.

The characteristics of the elliptical shape 408 will now be described. The elliptical shape 408 comprises an ellipse having a major axis 410 and a minor axis 412. The ellipse crosses the major axis 410 at points ±a and the minor axis 412 at points ±b. The major axis 410 and the minor axis 412 cross at the origin o. The ellipse also comprises foci located at points ±c on the major axis 410. The junction point of adjacent lens elements 402a, 404a, 406a crosses the elliptical shape 408 at a distance y from the major axis 410. The optical axis of the lenticule 404, which is the major axis 410 of the elliptical shape 408, is perpendicular to the rear surface 407 of the array 400. The vertex of the lens element 404a is positioned along the major axis 410 of the elliptical shape 408.

For the lenticular lens array 400, the maximum separation between the vertex of each lens element 402a, 404a, 406a is given by the following equation:

$$S_{max} = 2b \tag{4}$$

The maximum separation between the vertex of each lens element 402a, 404a, 406a also is given by the following equation:

$$S_{max} = \frac{2RN}{\sqrt{N^2 - 1}} \tag{5}$$

The array 400 has a pitch defined by the number of lenticules per unit length (lpu). For example, the unit length can comprise an inch or a millimeter. For the lenticular lens array 400, the minimum pitch is given by the following equation:

$$P_{min} = \frac{1}{2b} [lpu] \tag{6}$$

Parameters for a particular application of the lenticular lens array 400 can determine the characteristics of the elliptical shape 408. The characteristics can be determined for each application. For example, the characteristics d, t, y, and R of the elliptical shape 408 can be determined from the refractive index of the material forming the array 400 and standard geometric equations. For instance, the major axis 410 can lie along an x-axis and the minor axis 412 can lie along a y-axis of a rectangular coordinate system. Accordingly, the elliptical shape 408 is given by the following equation:

$$y^2 - 2Rx + px^2 = 0 \tag{7}$$

The constant p can be determined in terms of a conic constant as shown in the following equation:

$$p = \kappa + 1 \tag{8}$$

The conic constant κ can define the elliptical shape of the lens 404 and can be determined from the following equation:

$$\kappa = -\frac{1}{N^2} \tag{9}$$

The refractive index N is typically in the range of about 1.3 to about 2.0, and more commonly in the range of about 1.5 to about 1.6, for plastics used in the printing industry. Accordingly, the conic constant κ for the bounding refractive index range covers from about −0.25 to about −0.60. Accordingly, those conic constants indicate an elliptical shape for the lens element 404a, because a conic constant less than zero and greater than minus one indicates an elliptical shape.

The eccentricity e of the elliptical shape 408 is given by the following equations:

$$e = \sqrt{-\kappa}, \text{ or} \tag{10}$$

$$e = \frac{c}{a} \tag{11}$$

Other standard geometric relationships for the elliptical shape 408 include the following:

$$a = \frac{R}{p}, \text{ or} \tag{12}$$

$$a = \frac{R}{\kappa + 1} \tag{13}$$

$$b^2 = a^2 - c^2 \tag{14}$$

An example of determining particular characteristics for the elliptical shape 408 will now be described. A desired material to form the array 400 can be chosen. The desired material can have an associated refractive index N. Using the refractive index N, a conic constant κ for the elliptical shape 408 can be determined using equation (9). Additionally, a lenticule thickness t can be chosen for the particular application. For example, the lens thickness t can be in the range of about 0.003 to about 0.100 inch. In an exemplary embodiment, the lenticule thickness t can be chosen in the range of about 0.007 to about 0.011 inch. Using the standard geometric equations, the points ±a and ±b that define the elliptical shape 408 can be determined. For example, the radius R can be determined using equation (1) and the conic constant κ from equation (9). Then, points ±a can be determined using equation (12) or (13). Next, the eccentricity c can be determined using equation (10). Points ±c can be determined using equation (11). Points ±b can be determined using equation (14).

The distance y can be chosen based on the particular application for the array 400. The distance y is one half the width of the lens element 404a. The width of the lens element 404a can define a field of view for the lens element 404a on the rear surface 407. Accordingly, the distance y can be chosen to provide a field of view wide enough for a desired number of interlaced images. After choosing the distance y, the x coordinate on the major axis 410 for the distance y can be determined using equation (7).

The particular characteristics of the elliptical shape 408 can be determined from many combinations of the parameters that define those characteristics. Accordingly, the present invention encompasses determining elliptical characteristics based on a different set of chosen or given initial parameters than those described above.

Figure 5:
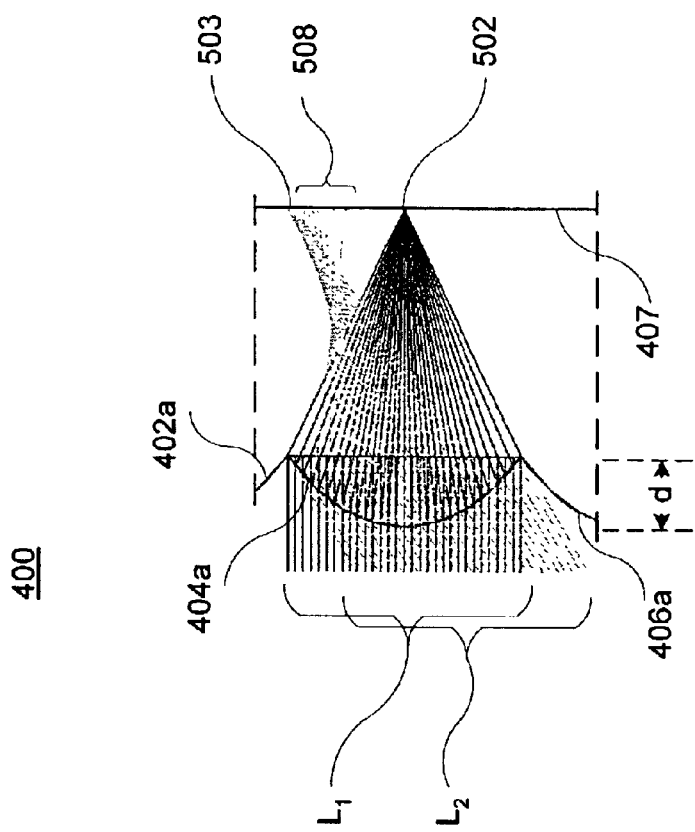
FIG. 5 illustrates a light ray trace illustrating optical characteristics of a lenticular lens array according to an exemplary embodiment of the present invention.

FIG. 5 illustrates a light ray trace illustrating optical characteristics of the lenticular lens array 400 according to an exemplary embodiment of the present invention. The lenticular lens array 400 can mitigate the spherical aberration typically produced by a conventional array. For example, the array 400 can provide a substantially focused axial image and can improve the off-axis image. As shown in FIG. 5, the on-axis light $L_1$ can pass through the lens element 404a of the array 400 and can be focused at point 502 on the rear surface 407. As shown, the elliptically-shaped lens element 404a can mitigate spherical aberration produced around the focal point 502. By reducing the base spherical aberration, spherochromatism can also be reduced. Additionally, the off-axis image produced from the off-axis light $L_2$ at point 503 is improved over the conventional lens, with coma 508 being the clear residual aberration. Also, the elliptically-shaped lens element 404a can reduce the lens junction depth d between adjacent lens elements. Accordingly, the array 400 can mitigate off-axis light blocking by adjacent lenses, as shown in FIG. 4. For a given width 2y, radius R, and index of refraction N, ghosting can be reduced because off-axis light blocking is reduced compared to a conventional circular array having the same width, radius, and index of refraction characteristics.

Figure 6:
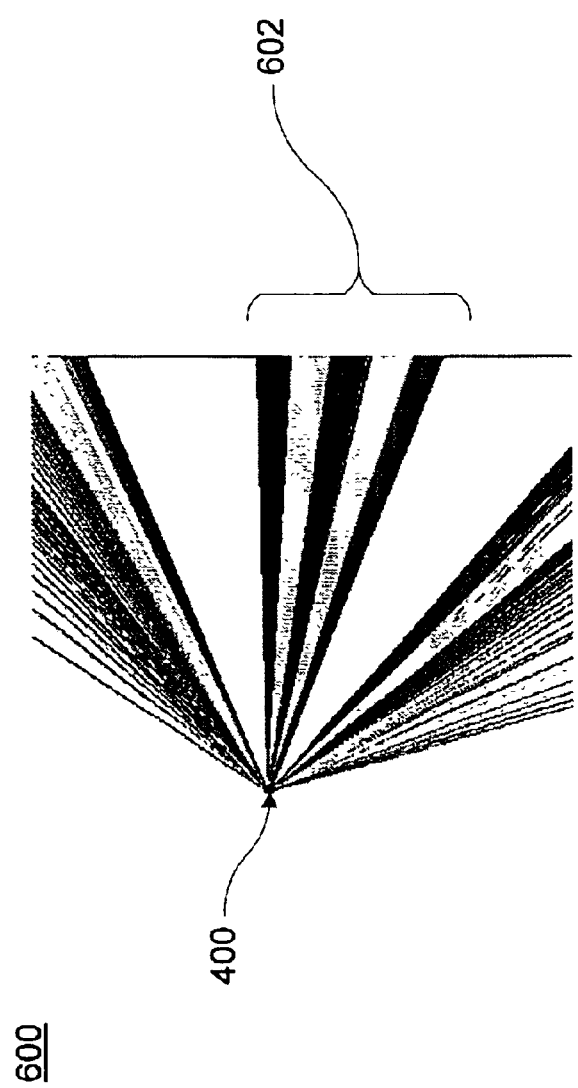
FIG. 6 illustrates a light beam projection illustrating additional optical characteristics of the lenticular lens array according to an exemplary embodiment of the present invention.

FIG. 6 illustrates a light beam projection illustrating additional optical characteristics of the lenticular lens array 400 according to an exemplary embodiment of the present invention. FIG. 6 illustrates light beams projected to an observer from different printed areas of the lenticular lens array 400. As shown, the light beams in the central area 602 are reasonably matched over the angle of the elliptically-shaped lens.

Figure 7:
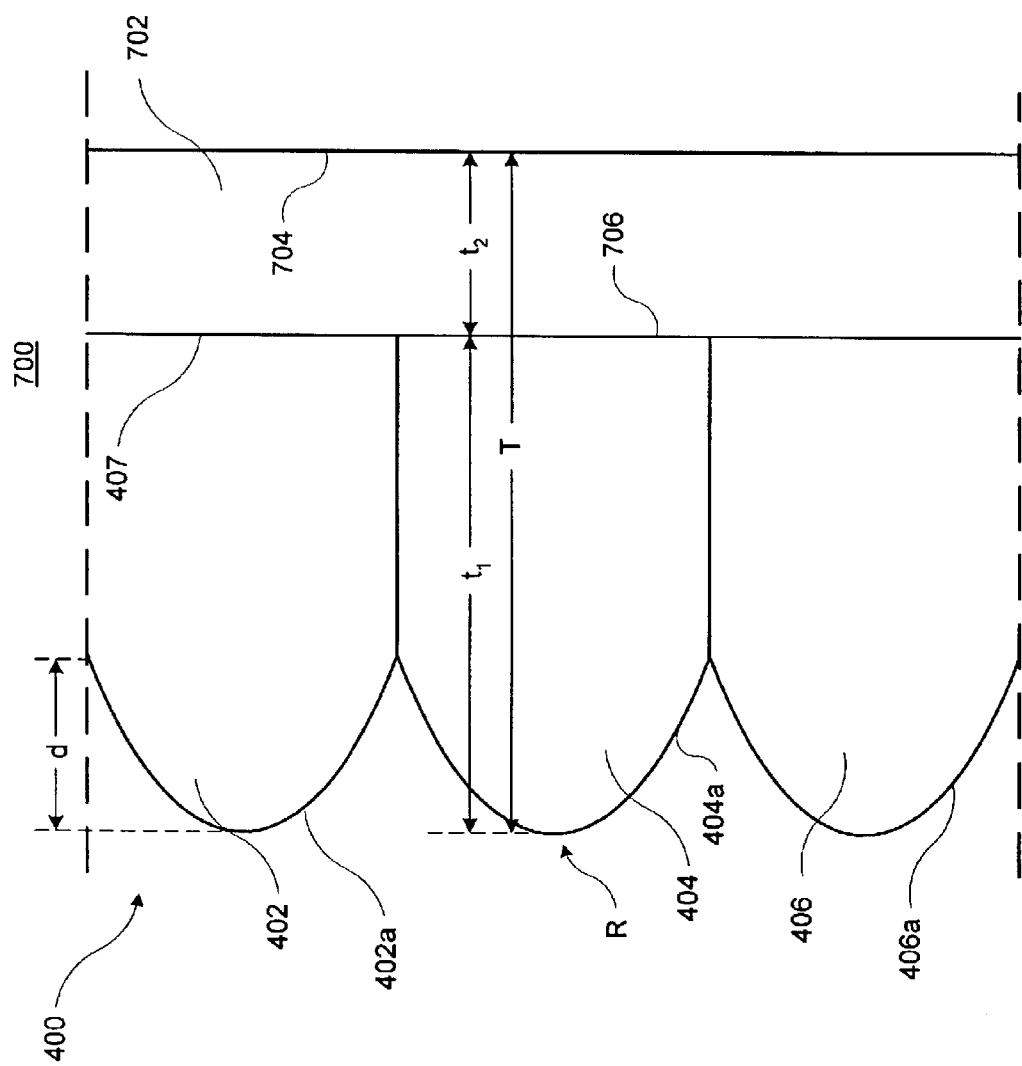
FIG. 7 illustrates a partial cross section of a lenticular lens array according to an alternative exemplary embodiment of the present invention.

FIG. 7 illustrates a partial cross section of a lenticular lens array 700 according to an alternative exemplary embodiment of the present invention. The array 700 can comprise the lenticular lens array 400 coupled to a substrate 702. In the exemplary embodiment, the lens elements 402a, 404a, and 406a can focus light on a rear surface 704 of the substrate 702. The total distance T from each lens vertex to the rear surface 704 of the substrate 702 can comprise the distance $t_1$ from the lens vertex to the rear surface 407 of the array 400 plus the distance $t_2$ from the rear surface 407 of the array 400 to the rear surface 704 of the substrate 702. In practice, the lenticular lens array is cast and has a thickness $t_1$ typically equal to about lens junction depth d or slightly greater than the lens junction depth d. The characteristics of the elliptically-shaped lenses 402a, 404a, 406a can be similar to those described above with reference to FIG. 4.

The array 400 and the substrate 702 can comprise different materials. Accordingly, the different materials can have different refractive indexes. For example, the array 400 can comprise a material having a refractive index of $N_1$, and the substrate 702 can comprise a material having a refractive index of $N_2$. The different refractive indices of the array and substrate materials can introduce additional spherical aberration. For example, for a single additional substrate of thickness $t_2$ and refractive index $N_2$, the focal displacement is shifted with respect to an array comprising a single material of refractive index $N_1$ and having the same R. The shift in focal displacement can be either positive or negative depending upon the relationship of the materials. To compensate for the different refractive indices, equation (1) can be modified to the following equation to determine the radius R of each lens element 402a, 404a, 406a when the array 700 comprises two or more different materials:

$$R = (N_1 - 1)\left(\frac{t_1}{N_1} + \frac{t_2}{N_2} + \ldots \frac{t_n}{N_n}\right) \tag{15}$$

The value of the radius R results in the image from a distant source being formed upon the back surface of the substrate 702. As shown above, equation (15) can apply when the lenticular lens array comprises more than one substrate.

The conic constant can be estimated from equation (9) and can be optimized with an optical computer program to mitigate the additionally induced spherical aberration of the substrate(s).

In an alternative exemplary embodiment, the substrate 702 can be bonded to the array 400 through a bonding layer (not shown) such as a resin. Typically, a bonding layer will have a finite thickness and an associated index of refraction.

If a bonding layer is used, it can be treated as an additional substrate. Accordingly, equation (15) can be used to compensate for the thickness and index of refraction of the bonding layer, as well as for that of the substrate. The associated conic constant is determined and optimized in the manner previous described.

In another alternative exemplary embodiment, the substrate 702 can comprise an adhesive layer.

In another alternative exemplary embodiment, the substrate 702 can comprise an opaque substrate. For example, the opaque substrate can comprise paper. Additionally, the interlaced image can be printed on a front surface 706 of the opaque substrate. Then, the opaque substrate can be laminated to the lenticular lens array 400. In that case, the image is located at the rear surface 407 of the array 400. Accordingly, the thickness of the substrate does not have to be considered to determine the proper thickness T. However, if a bonding layer is used to laminate the opaque substrate to the array 400, then the thickness of the bonding layer should be considered to determine the proper thickness T.

In another alternative exemplary embodiment, the lenticules 402–406 can be cast onto the substrate 702 such that a discontinuity exists between one or more pairs of adjacent lenticules. For example, the lenticules 402–406 can be cast onto the substrate 702 such that a discontinuity exists between lenticules 402 and 404 or between lenticules 404 and 406.

Figure 8B:
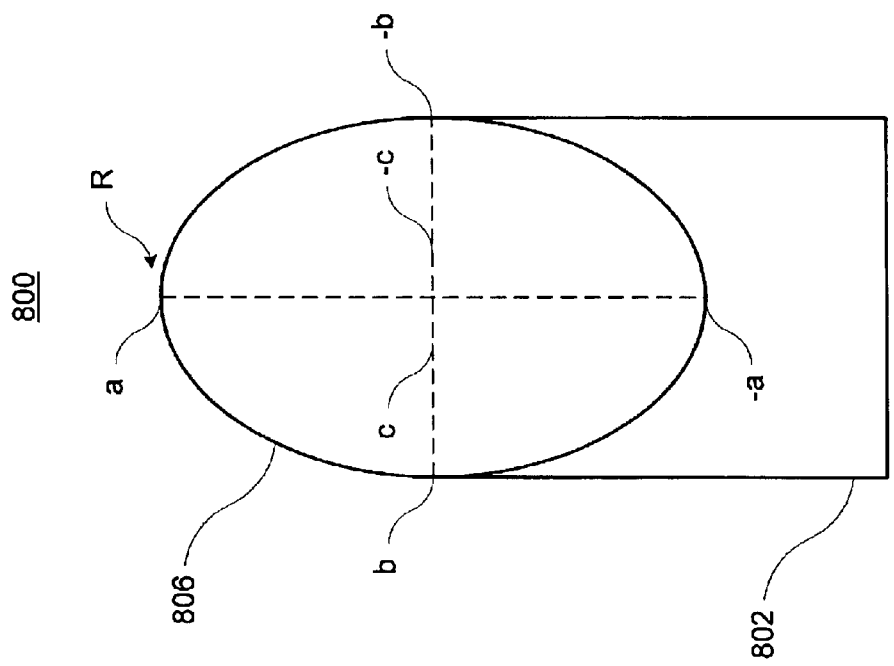
FIG. 8B illustrates a front view of the tool for forming elliptically-shaped lens elements according to an exemplary embodiment of the present invention.
Figure 8A:
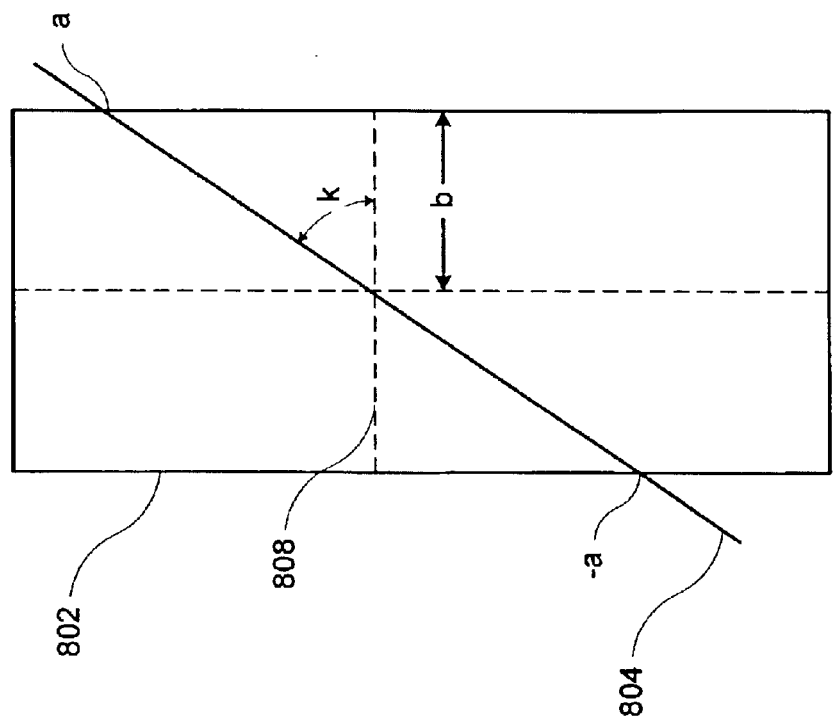
FIG. 8A illustrates a cross-section of a cylindrical rod for producing a tool for forming elliptically-shaped lens elements according to an exemplary embodiment of the present invention.

A tool 800 for producing an elliptically-shaped lens element according to an exemplary embodiment of the present invention will now be described with reference to FIGS. 8A and B. Tool 800 can be constructed from diamond or other suitable material. FIG. 8A illustrates a cross-section of a base member 802 for producing the tool 800 for forming elliptically-shaped lens elements according to an exemplary embodiment of the present invention. FIG. 8B illustrates a front view of the tool 800 for forming elliptically-shaped lens elements according to an exemplary embodiment of the present invention.

The tool 800 can be is used to produce a regular array of groves in a mandrel for casting or extruding the lenticular lens array. The tool 800 is not used to directly form the lenticular lens array. For example, the mandrel can comprise a drum, and the tool 800 can produce a spiral or screw pattern in the drum. Alternatively, the tool 800 can produce a straight-cut (parallel-grooved) pattern in the drum. Furthermore, the mandrel can be coated with a copper alloy prior to being shaped by the tool 800. The copper alloy can be used because it cuts cleanly and holds it shape. After cutting, the copper alloy can be plated with another material to improve the mandrel's durability. For example, the plating material can comprise chrome. If a coating or plating material is used after cutting, then the dimensions of the tool 800 can be adjusted (increased) to compensate for a finite thickness of the coating or plating material. The following description details a tool that creates a mandrel without a coating or plating. In practice, the size of the tool 800 can account for the added thickness of the coating or plating.

As shown in the exemplary embodiments of FIGS. 8A and 8B, the base member 802 can comprise a cylindrical rod and can have a radius b corresponding to the dimensions ±b of an elliptical shape 806 for the tool 800. The base member 802 can be cut along a plane 804 at an angle k to a minor axis 808 of the base member 802. The angle k can be determined from the following equation:

$$\cosine(k) = \frac{b}{a} \quad (16)$$

The elements b and a correspond to elliptical characteristics of the elliptical shape 806. The elliptical shape 806 corresponds to the desired elliptical shape of lenticular lens elements on a lenticular lens array according to an exemplary embodiment of the present invention. Accordingly, each of the elliptical characteristics a, b, and c, correspond to the same characteristics for the elliptically shaped lens elements of the array.

In an alternative exemplary embodiment, the base member 802 can comprise a cone. The cone can comprise a truncated cone. The cone can comprise diamond or other suitable material. Standard geometric equations can be used to determine a proper angle to cut the cone to produce the desired elliptical shape for the tool 800. Accordingly, the cone can be cut at an angle to produce the desired elliptical shape for the tool. Potential advantages of a truncated conical base member 802 include less material being required and the conical apex angle providing a general reduction in angular range capability of the fabrication equipment.

The tool 800 comprises a mother tool that can be used to cut a mandrel for producing elliptically-shaped lens elements of the array. The mandrel then can be is used to create the elliptically-shaped lens elements in a lenticular lens array. For example, the mandrel can be used for casting or extruding the lenticular lens elements of the array.

Figure 9:
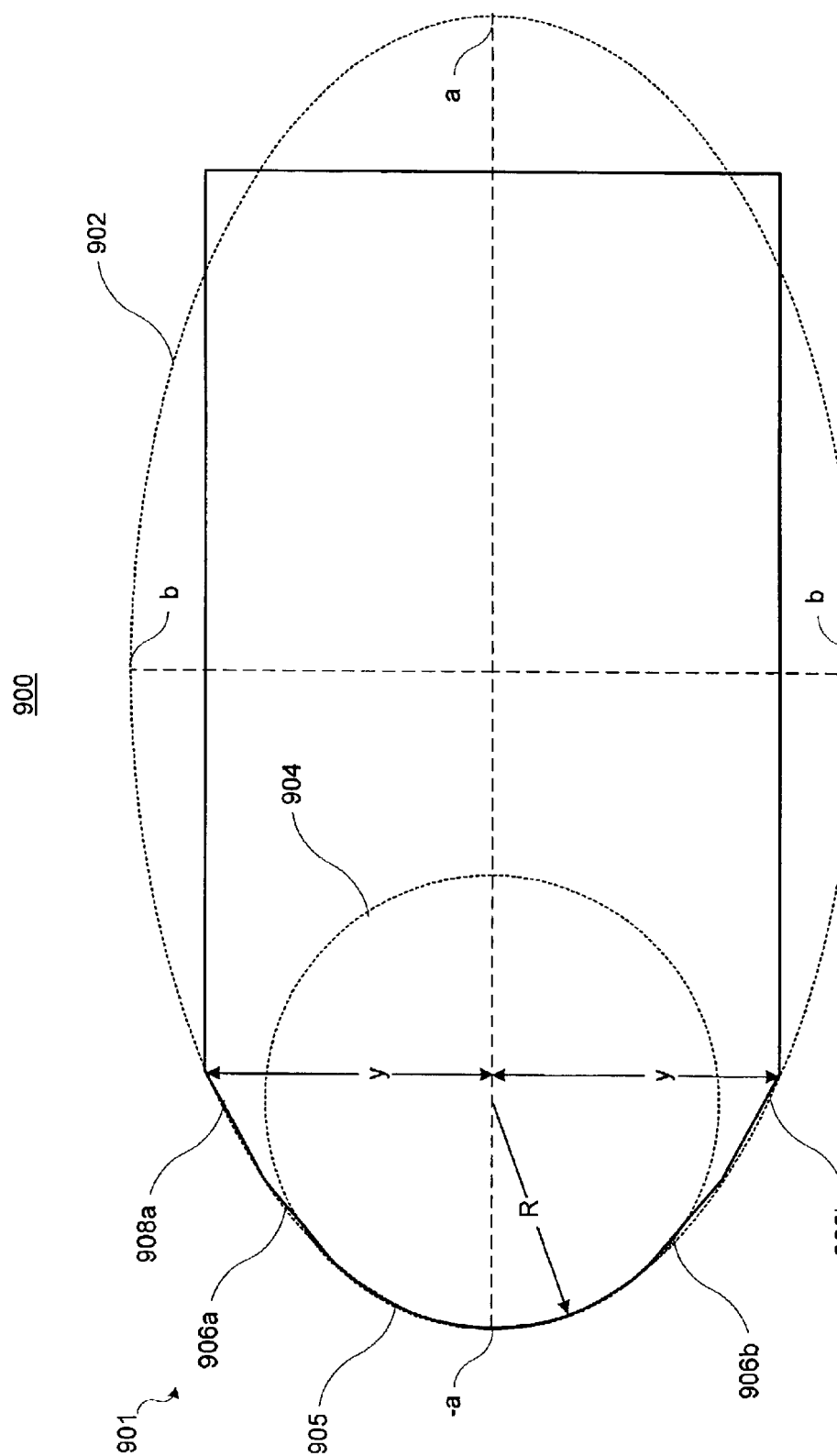
FIG. 9 illustrates a cross section of a pseudo elliptical lenticule for approximating an elliptically shaped lens element of a lenticular lens array according to an exemplary embodiment of the present invention.

FIG. 9 illustrates a pseudo elliptical lenticule 900 for approximating an elliptically shaped lens element of a lenticular lens array according to an exemplary embodiment of the present invention. The lenticule 900 can be included in a lenticular lens array according to an exemplary embodiment of the present invention. The lenticule 900 comprises a pseudo elliptical lens element 901. As shown, the pseudo elliptical lens element 901 approximates a portion of an elliptical shape 902. The pseudo elliptical lens element 901 comprises a circular portion 905, corresponding straight portions 906a, 906b, and corresponding straight portions 908a, 908b.

The circular portion 905 comprises a portion of a circular shape 904 that approximates the radius R of the elliptical shape 902. Accordingly, the circular shape 904 can have a radius equal to the radius R of the elliptical shape. Alternatively, the circular shape 904 can have a radius different from the radius R of the elliptical shape, if the different radius can better approximate the elliptical shape. The circular portion 905 can comprise that portion of the circular shape 904 that approximates the elliptical shape 902 within a specified tolerance. The specified tolerance can be determined based on a desired projected image quality for a particular application. The maximum residual shape error of the circular and straight regions can be maintained to be approximately the same.

Corresponding straight portions 906a, 906b can be provided beginning at a point where the circular shape 904 exceeds the specified tolerance from the elliptical shape 902. Accordingly, straight portions 906a, 906b can approximate a portion of the desired elliptical shape 902.

Corresponding straight portions 908a, 908b can be provided beginning at a point where the straight portions 906a, 906b, respectively, exceed the specified tolerance from the elliptical shape 902. The straight portions 908a, 908b can approximate a portion of the desired elliptical shape 902.

Any number of straight portions can be used to approximate the elliptical shape 902. The number of straight portions can be adjusted to minimize deviation from the elliptical shape 902. For example, using more straight portions can achieve less deviation from the desired elliptical shape 902. In other words, a smaller tolerance limit can be used when more straight portions are used. Typically, if more straight portions are used, then a smaller circular portion 905 can be used to allow a smaller tolerance limit.

In an alternative exemplary embodiment, a plurality of facets can be used to approximate the desired elliptical shape without using a circular portion. In one embodiment, corresponding pairs of facets can be used to approximate the desired elliptical shape. In that embodiment, the pseudo elliptical lens elements can have a point where a facet pair meets at the vertex of the lens element. In an alternative embodiment, the vertex can be approximated with a single facet positioned substantially orthogonal to the major axis of the elliptical shape, and corresponding pairs of facets can be used to approximate outer portions of the elliptical shape.

Accordingly, the pseudo elliptical lens element 901 can approximate an elliptical shape 902, thereby improving the image characteristics in a similar manner as described above for the array 400 of FIG. 4.

Figure 10:
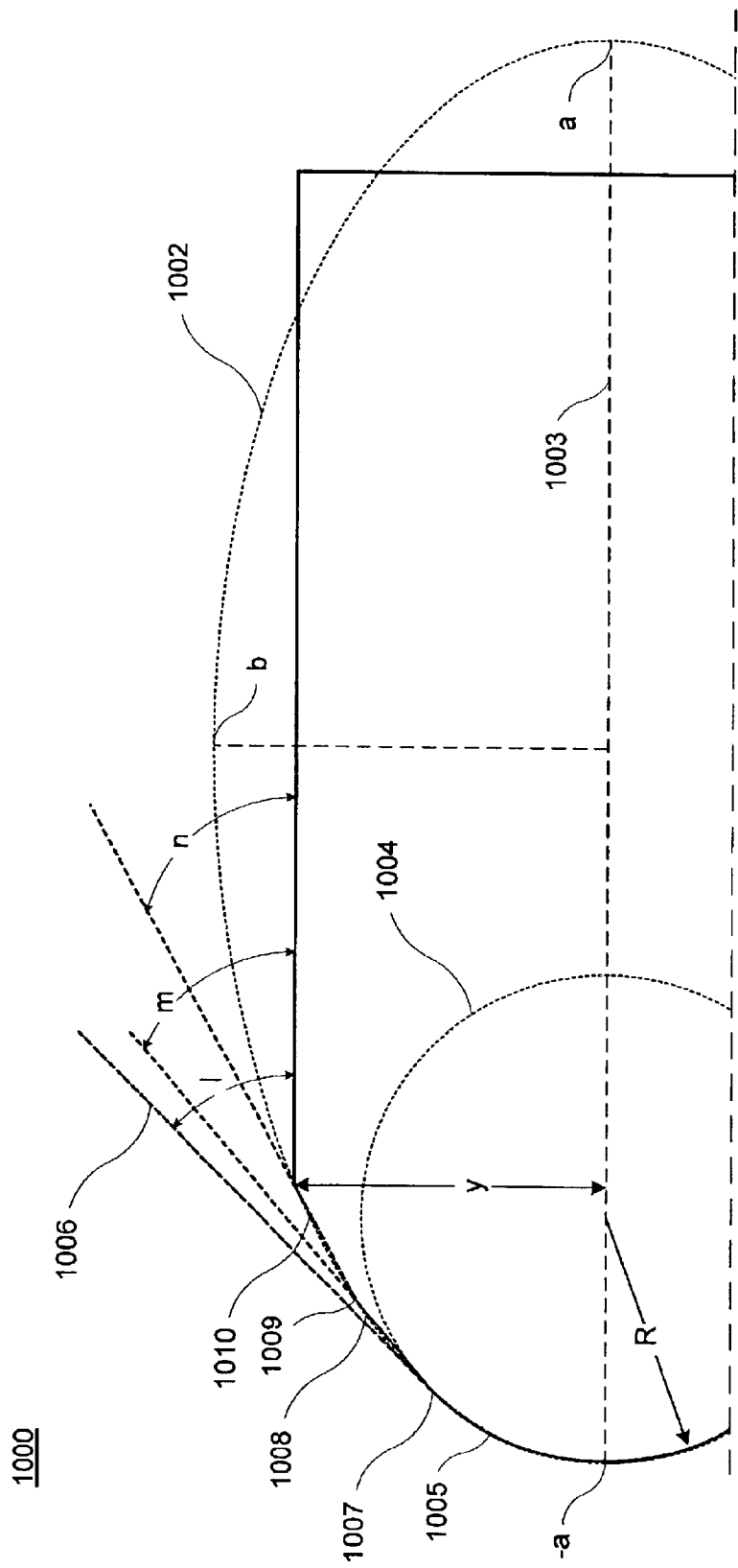
FIG. 10 illustrates a pseudo elliptical tool for creating a pseudo elliptical lens element according to an exemplary embodiment of the present invention.

FIG. 10 illustrates a pseudo elliptical tool 1000 for creating a pseudo elliptical lens element according to an exemplary embodiment of the present invention. The tool 1000 can be is used to produce a regular array of groves in a mandrel for casting or extruding the lenticular lens array. The tool 1000 is not used to directly form the lenticular lens array. For example, the mandrel can comprise a drum, and the tool 1000 can produce a spiral or screw pattern in the drum. Alternatively, the tool 1000 can produce a straight-cut (parallel grooved) pattern in the drum. Furthermore, the mandrel can be coated with a copper alloy prior to being shaped by the tool 1000. The copper alloy can be used because it cuts cleanly and holds it shape. After cutting, the copper alloy can be plated with another material to improve the mandrel's durability. For example, the plating material can comprise chrome. If a coating or plating material is used after cutting, then the dimensions of the tool 1000 can be adjusted (increased) to compensate for a finite thickness of the coating or plating material. The following description details a tool that creates a mandrel without a coating or plating. In practice, the size of the tool 1000 can account for the added thickness of the coating or plating.

In FIG. 10, only one side of the elliptical tool 1000 is illustrated. The other side of the elliptical tool 1000 comprises a mirror image of the illustrated side. The elliptical tool 1000 can be constructed from diamond or other suitable material. The elliptical tool 1000 can comprise a tool for cutting a form that can be used to extrude or cast pseudo elliptical lens elements of a lenticular lens array according to an exemplary embodiment of the present invention.

As shown, the desired elliptical shape comprises an elliptical shape 1002. A circular shape 1004 having a radius can approximate a portion 1005 of the elliptical shape 1002. Point 1007 indicates an intersection of a tangent 1006 to the ellipse 1004 where the circular shape 1004 exceeds a specified tolerance from the elliptical shape 1002. A first facet 1008 can be provided beginning at the point 1007 and can approximate a portion of the elliptical shape 1002. A second facet 1010 can be provided beginning at a point 1009 where the first facet exceeds the specified tolerance from the elliptical shape 1002. The second facet 1010 can approximate a portion of the elliptical shape 1002 until the desired width y is reached.

The tangent 1006, the first facet 1008, and the second facet 1010 can form an angle l, m, and n, respectively, with the major axis 1003 of the elliptical shape 1002. The actual angles l, m, and n, the radius R, and the length of the first and second facets 1008, 1010 can be determined for a particular application based on the characteristics of the elliptical shape 1002 and the specified tolerance.

In practice, the radius of the circular shape 1004 can be chosen to approximate a radius R of the elliptical shape 1002. Accordingly, the circular shape 1004 can have a radius equal to the radius R of the elliptical shape. Alternatively, the circular shape 1004 can have a radius different from the radius R of the elliptical shape, if the different radius can better approximate the elliptical shape. The chosen radius can be used until it exceeds the specified tolerance from the elliptical shape 1002. The angle m of the first facet 1008 can be determined based on the elliptical shape 1002 at the tangent point 1007. Similarly, the angle n of the second facet 1010 can be determined based on the elliptical shape 1002 at the point 1009.

Any number of facets can be used to approximate the elliptical shape 1002. The number of facets can be adjusted to minimize deviation from the elliptical shape 1002. For example, using more facets can achieve less deviation from the desired elliptical shape 1002. In other words, a smaller tolerance limit can be used when more facets are used. Typically, if more facets are used, then a smaller circular portion 1005 can be used to allow a smaller tolerance limit.

The mitigation of the spherical aberration afforded by the inclusion of the elliptically shaped lens, when compared to conventional lenses, allows the utilization of thinner lenticular lenses to achieve the same or better performance. A common metric used to express the light gathering capability of a lens is know as the focal ratio or F-number (F/#). The focal ratio is simply defined at the ratio of the focal length of the lens divided by the diameter of the lens (specifically the entrance pupil of the lens). The spherical aberration of the conventional lens follows the well-known relationship of being directly proportional to $1/(F/\#)^3$. As a conventional lenticular lens is thinned (t becoming smaller) while maintaining the pitch, it is evident that the image resolution/quality degrades quickly since the F# becomes smaller. For example, the resolution decreases by a factor of over 10 as the t changes from 0.020 inch to 0.009 inch. Sheets of thinner lenticular lenses offer significant advantages when affixed to cylindrical objects as explained elsewhere in this specification.

In an alternative exemplary embodiment, a plurality of facets can be used to approximate the desired elliptical shape without using a circular portion. In one embodiment, corresponding pairs of facets can be used to approximate the desired elliptical shape. In that embodiment, the pseudo elliptical lens elements can have a point where a facet pair meets at the vertex of the lens element. In an alternative embodiment, the vertex can be approximated with a single facet positioned substantially orthogonal to the major axis of the elliptical shape, and corresponding pairs of facets can be used to approximate outer portions of the elliptical shape.

The tool 1000 can be used to carve a mandrel having a pseudo elliptical shape. The pseudo elliptical mandrel then can be used for casting or extruding lens elements having a pseudo elliptical shape for a lenticular lens array.

The elliptical shape of the lenticular lens elements according to the exemplary embodiments of the present invention can provide the following benefits over conventional designs: producing less visible print projected aberrations; providing higher printed image contrast; providing thinner gauge lenticular materials that maintain the print quality present in thicker gauge materials (for example, the thinner lenticular materials can be produced with a thickness less than 0.012 inch, and more specifically in the range of about 0.005 inch to about 0.010 inch); providing print images with clearer and smaller serif type and point sizes; providing the thinner lenticular material gauges that can be flexible enough to affix to cylindrical or truncated packaging containers, such as jars, bottles, beverage cups, cartons, etc. without de-laminating off the consumer packaging; providing the thinner lenticular material gauges that can be adaptable to the packaging industry's in-line labeling applicators for rotary roll fed blow down or wipe-down labeling systems; providing the thinner gauge materials that can reduce the thickness and weight per square inch of material, thereby reducing cost; providing increased lenticule viewing width area for broader animated imaging techniques at a lower material thickness and finer lens pitch; or reducing cross-talk and image ghosting.

The elliptical shape lens elements of the lenticular lens array according to the exemplary embodiments of the present invention can be used in the following printed product types and markets due to the thinner lenticular material possible with the elliptical design: entire outer lenticular packaging enhancements (box overwraps); segmented applied lenticular label coverage to outer packaging; pressure sensitive, non-pressure sensitive, self-adhesive, and non-self-adhesive lenticular label products; multi-ply, multi-substrate peel open pressure sensitive and non-pressure sensitive lenticular labels; lenticular laminated to paperboard products; packaging in-packs and on packs; beverage cups having decorative partial or full lenticular cup wraps; video, dvd, or cd disc cover lenticular treatments; direct mail; magazine inserts; newspaper inserts; or contest and game sweepstake components that comprise use of partial or full lenticular enhancements.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A lenticular lens array for creating a visual effect for an image viewed through said lenticular lens array, comprising:
    a plurality of lenticules disposed adjacent to each other to form the lenticular lens array, each lenticule comprising a lenticular lens element and said array comprising substantially flat back surface on a side opposite to said lenticular lens elements,
    wherein each lenticular lens element has a vertex and a cross section comprising a portion of an elliptical shape, the elliptical shape comprising a major axis disposed substantially perpendicular to the substantially flat back surface of said lenticular lens array,
    wherein each lenticular lens element comprises a focal point along the major axis of the elliptical shape on an image disposed at about the substantially flat back surface of said lenticular lens array; and
    wherein the vertex of each respective lenticular lens element lies substantially along the major axis of the elliptical shape.

2. The lenticular lens array according to claim 1, wherein the image comprises an interlaced image printed on the substantially flat back surface of said lenticular lens array, wherein viewable portions of said interlaced image change as a viewing angle of said lenticular lens array changes.

3. The lenticular lens array according to claim 1, wherein the image comprises an interlaced image printed on the substantially flat back surface of said lenticular lens array,
    wherein viewable portions of said interlaced image produce a three-dimensional visual effect when viewed through said lenticular lens array.

4. The lenticular lens array according to claim 1, further comprising an opaque substrate coupled to said plurality of lenticules, wherein the image comprises an interlaced image printed on said substrate, and
    wherein viewable portions of the interlaced image change as a viewing angle of said lenticular lens array changes.

5. The lenticular lens array according to claim 1, further comprising a substrate coupled to said plurality of lenticules.

6. The lenticular lens array according to claim 5, wherein said plurality of lenticules are cast onto said substrate.

7. The lenticular lens array according to claim 6, wherein a discontinuity exists between two adjacent lenticules.

8. The lenticular lens array according to claim 1, further comprising a plurality of substrates coupled to said lenticular lens array.

9. The lenticular lens array according to claim 8, wherein one of said plurality of substrates comprises an adhesive layer, and
    wherein one of said plurality of substrates comprises the substantially flat back surface of said lenticular lens array.

10. The lenticular lens array according to claim 2, wherein the image is printed on said lenticular lens array by one of screen printing, letterpress printing, flexographic printing, offset lithography printing, gravure printing, electro-photography printing, iconography printing, magnetography printing, ink jet printing, thermography printing, and photographic printing.

11. The lenticular lens array according to claim 2, wherein the image is printed on said lenticular lens array by one of a roll-fed printing method and a sheet-fed printing method.

12. The lenticular lens array according to claim 4, wherein said opaque substrate comprises a paper material.

13. The lenticular lens array according to claim 4, wherein the image is printed on said opaque substrate by one of screen printing, letterpress printing, flexographic printing, offset lithography printing, gravure printing, electro-photography printing, iconography printing, magnetography printing, ink jet printing, thermography printing, and photographic printing.

14. The lenticular lens array according to claim 4, wherein the image is printed on said opaque substrate by one of a roll-fed printing method and a sheet-fed printing method.

15. The lenticular lens array according to claim 1, wherein said lenticular lens array comprises a plastic material.

16. The lenticular lens array according to claim 1, wherein said lenticular lens array is coupled to one of a package, cup, jar, bottle, container, label, carton, video cassette, digital video disk, and compact disc.

17. The lenticular lens array according to claim 1, wherein said lenticular lens array comprises one of a direct mail item, magazine insert, newspaper insert, and sweepstakes component.

18. The lenticular lens array according to claim 1, wherein said lenticules further comprise at least one substrate that forms the substantially flat back surface of said lenticular lens array.

19. The lenticular lens array according to claim 1, wherein a conic constant in the range of about −0.25 to about −0.60 defines the elliptical shape.

20. The lenticular lens array according to claim 1, wherein the image comprises an interlaced image printed on the substantially flat back surface of said lenticular lens array,
wherein viewable portions of said interlaced image produce a morph visual effect when viewed through said lenticular lens array.

21. The lenticular lens array according to claim 1, wherein the image comprises an interlaced image printed on the substantially flat back surface of said lenticular lens array,
wherein viewable portions of said interlaeed image produce a zoom visual effect when viewed through said lenticular lens array.

22. A lenticular lens array for creating a visual effect for an image viewed through said lenticular lens array, comprising:
a plurality of lenticules disposed adjacent to each other to form the lenticular lens array, each lenticule comprising a lenticular lens element and said array comprising a substantially flat back surface on a side opposite to said lenticular lens element,
wherein each lenticular lens element has a vertex and has a cross section comprising an approximated portion of an elliptical shape defined by a continuous surface having a plurality of first derivative discontinuites at junctions of adjacent portions of the approximated portion of the elliptical shape, the elliptical shape comprising a major axis disposed substantially perpendicular to the substantially flat back surface of said lenticular lens array,
wherein each lenticular lens element comprises a focal point along the major axis of the elliptical shape about the substantially flat back surface of said lenticular lens array, and
wherein the vertex of each respective lenticular lens element lies substantially along the major axis of the elliptical shape.

23. The lenticular lens array according to claim 22, wherein said lenticular lens array comprises a plastic material.

24. The lenticular lens array according to claim 22, wherein the approximated portion of the elliptical shape comprises:
a circular-shaped portion that approximates a circular-shaped portion of the elliptical shape; and
a plurality of substantially straight portions, each substantially straight portion approximating a portion of the elliptical shape.

25. The lenticular lens array according to claim 22, wherein the approximated portion of the elliptical shape comprises:
a circular-shaped portion that approximates a circular-shaped portion of the elliptical shape;
a first pair of corresponding substantially straight portions separately disposed adjacent to opposite ends of the circular-shaped portion and approximating a first portion of the elliptical shape; and
a second pair of corresponding substantially straight portions separately disposed adjacent to a respective one of the first pair of substantially straight portions and approximating a second portion of the elliptical shape.

26. The lenticular lens array according to claim 22, wherein the approximated poition of the elliptical shape comprises:
a circular-shaped portion that approximates a circular-shaped portion of the elliptical shape; and
a first substantially straight portion disposed adjacent to the circular-shaped portion and approximating a first portion of the elliptical shape.

27. The lenticular lens array according to claim 26, wherein the approximated portion of the elliptical shape further comprises a second substantially straight portion disposed adjacent to the first substantially straight portion and approximating a second portion of the elliptical shape.

28. The lenticular lens array according to claim 22, further comprising a substrate coupled said lenticular lens array.

29. The lenticular lens array according to claim 22, wherein the approximated portion of the elliptical shape comprises a plurality of facets each approximating a portion of the elliptical shape.

30. The lenticular lens array according to claim 29, wherein the plurality of facets comprises a plurality of corresponding pairs of facets.

31. The lenticular lens array according to claim 29, wherein the plurality of facets comprises:
a vertex facet disposed at the vertex of respective lenticular lens elements and positioned substantially orthogonal to the major axis of the elliptical shape; and
a plurality of corresponding pairs of facets disposed outside of said vertex facet.

32. The lenticular lens array according to claim 22, wherein said lenticular lens array is coupled to one of a package, cup, jar, bottle, container, label, carton, video cassette, digital video disk, and compact disc.

33. The lenticular lens array according to claim 22, wherein said lenticular lens array comprises one of a direct mail item, magazine insert, newspaper insert, and sweepstakes component.

34. The lenticular lens array according to claim 22, further comprising an interlaced image printed on the substantially flat back surface of said lenticular lens array,
wherein viewable portions of said interlaced image produce a zoom visual effect when viewed through said lenticular lens array.

35. The lenticular lens array according to claim 22, further comprising an interlaced image printed on the substantially flat back surface of said lenticular lens array.
wherein viewable portions of said interlaced image produce a morph visual effect when viewed through said lenticular lens array.

36. The lenticular lens array according to claim 22, wherein a conic constant in the range of about −0.25 to about −0.60 defines the elliptical shape.

37. The lenticular lens array according to claim 22, wherein said lenticules further comprise at least one substrate that forms the substantially flat back surface of said lenticular lens array.

38. The lenticular lens array according to claim 22, further comprising a plurality of substrates coupled to said lenticular lens array.

39. The lenticular lens array according to claim 38, wherein one of said plurality of substrates comprises an adhesive layer, and
wherein one of said substrates comprises the substantially flat back surface of said plurality of lenticules.

40. The lenticular lens array according to claim 22, further comprising a substrate coupled to said plurality of lenticules.

41. The lenticular lens array according to claim 40, wherein said plurality of lenticules are cast onto said substrate.

42. The lenticular lens array according to claim 41, wherein a discontinuity exists between two adjacent lenticules.

43. The lenticular lens array according to claim 22, further comprising an interlaced image printed on the flat surface of said lenticular lens array,
wherein viewable portions of said interlaced image produce a three-dimensional visual effect when viewed through said lenticular lens array.

44. The lenticular lens array according to claim 22, further comprising an interlaced image printed on the flat surface of said lenticular lens array,
wherein viewable portions of said interlaced image change as a viewing angle of said lenticular lens array changes.

45. The lenticular lens array according to claim 44, wherein the image is printed on said lenticular lens array by one of screen printing, letterpress printing, flexographic printing, offset lithography printing, gravure printing, electro-photography printing, iconography printing, magnetography printing, ink jet printing, thermography printing, and photographic printing.

46. The lenticular lens array according to claim 44, wherein the image is printed on said lenticular lens array by one of a roll-fed printing method and a sheet-fed printing method.

47. The lenticular lens array according to claim 22, further comprising an opaque substrate, having an interlaced image printed thereon, coupled to said plurality of lenticules, and
wherein viewable portions of the interlaced image change as a viewing angle of said lenticular lens array changes.

48. The lenticular lens array according to claim 47, wherein said opaque substrate comprises a paper material.

49. The lenticular lens array according to claim 47, wherein the image is printed on said opaque substrate by one of screen printing, letterpress printing, flexographic printing, offset lithography printing, gravure printing, electro-photography printing, iconography printing, magnetography printing, ink jet printing, thermography printing, and photographic printing.

50. The lenticular lens array according to claim 47, wherein the image is printed on said opaque substrate by one of a roll-fed printing method and a sheet-fed printing method.

51. A lenticular lens array for creating a visual effect for an image viewed through said lenticular lens array, comprising:
a plurality of lenticules disposed adjacent to each other to form the lenticular lens array, each lenticule comprising a lenticular lens element and said array comprising a flat back surface on a side opposite to said lenticular lens elements,
wherein each lenticular lens element has a vertex and a cross section comprising a portion of an elliptical shape, the elliptical shape comprising a major axis, and
wherein each lenticular lens element comprises a focal point along the major axis of the elliptical shape on an image disposed at the back surface of said lenticular lens array.

52. The lenticular lens array according to claim 51, wherein the image comprises an interlaced image printed on the back surface of said lenticular lens array,
wherein viewable portions of said interlaced image change as a viewing angle of said lenticular lens array changes.

53. The lenticular lens array according to claim 51, wherein the image comprises an interlaced image printed on the back surface of said lenticular lens array,
wherein viewable portions of said interlaced image produce a three-dimensional visual effect when viewed through said lenticular lens array.

54. The lenticular lens array according to claim 51, further comprising an opaque substrate coupled to said plurality of lenticules, wherein the image comprises an interlaced image printed on said substrate, and
wherein viewable portions of the interlaced image change as a viewing angle of said lenticular lens array changes.

55. The lenticular lens array according to claim 51, further comprising a substrate coupled to said plurality of lenticules.

56. The lenticular lens array according to claim 51, further comprising a plurality of substrates coupled to said lenticular lens array.

57. The lenticular lens array according to claim 56, wherein one of said plurality of substrates comprises an adhesive layer, and
wherein one of said plurality of substrates forms the back surface of said lenticular lens array.

58. The lenticular lens array according to claim 57, wherein said substrate that forms the back surface of said lenticular lens array comprises an opaque substrate.

59. The lenticular lens array according to claim 51, wherein a conic constant in the range of about −0.25 to about −0.60 defines the elliptical shape.

60. A lenticular lens array for creating a visual effect for an image viewed through said lenticular lens array, comprising:
a plurality of lenticules disposed adjacent to each other to form the lenticular lens array, each lenticule comprising a lenticular lens element and said array comprising a back surface on a side opposite to said lenticular lens element,
wherein each lenticular lens element has a vertex and has a cross section comprising an approximated portion of an elliptical shape defined by a continuous surface having a plurality of first derivative discontinuities at junctions of adjacent portions of the approximated portion of the elliptical shape, the elliptical shape comprising a major axis, and
wherein each lenticular lens element comprises a focal point along the major axis of the elliptical shape at the back surface of said lenticular lens array.

61. The lenticular lens array according to claim 60, wherein the approximated portion of the elliptical shape comprises:
a circular-shaped portion that approximates a circular-shaped portion of the elliptical shape; and
a plurality of substantially straight portions, each substantially straight portion approximating a portion of the elliptical shape.

62. The lenticular lens array according to claim 60, wherein the approximated portion of thr elliptical shape comprises:
a circular-shaped portion that approximates a circular-shaped portion of the elliptical shape;
a first pair of corresponding substantially straight portions separately disposed adjacent to opposite ends of the circular-shaped portion and approximating a first portion of the elliptical shape; and
a second pair of corresponding substantially straight portions separately disposed adjacent to a respective one of the first pair of substantially straight portions and approximating a second portion of the elliptical shape.

63. The lenticular lens array according to claim 60, wherein the approximated portion of the elliptical shape comprises:
a circular-shaped portion that approximates a circular-shaped portion of the elliptical shape; and a first substantially straight portion disposed adjacent to the circular-shaped portion and approximating a first portion of the elliptical shape.

64. The lenticular lens array according to claim 63, wherein the approximated portion of the elliptical shape further comprises a second substantially straight portion disposed adjacent to the first substantially straight portion and approximating a second portion of the elliptical shape.

65. The lenticular lens array according to claim 60, further comprising a substrate coupled said plurality of lenticules.

66. The lenticular lens array according to claim 60, wherein the approximated portion of the elliptical shape comprises a plurality of facets each approximating a portion of the elliptical shape.

67. The lenticular lens array according to claim 66, wherein the plurality of facets comprises a plurality of corresponding pairs of facets.

68. The lenticular lens array according to claim 66, wherein the plurality of facets comprises:

a vertex facet disposed at the vertex of respective lenticular lens elements and positioned substantially orthogonal to the major axis of the elliptical shape; and a plurality of corresponding pairs of facets disposed outside of said vertex facet.

69. The lenticular lens array according to claim 60, further comprising an interlaced image printed on the surface of said lenticular lens array, wherein viewable portions of said interlaced image change as a viewing angle of said lenticular lens array changes.

70. The lenticular lens array according to claim 60, further comprising an interlaced image printed on the surface of said lenticular lens array, wherein viewable portions of said interlaced image produce a three-dimensional visual effect when viewed through said lenticular lens array.

71. The lenticular lens array according to claim 60, further comprising an opaque substrate, having an interlaced image printed thereon, coupled to said plurality of lenticules.

72. The lenticular lens array according to claim 60, further comprising a substrate coupled to said plurality of lenticules.

73. The lenticular lens array according to claim 60, further comprising a plurality of substrates coupled to said lenticular lens array.

74. The lenticular lens array according to claim 73, wherein one of said plurality of subtrates comprises an adhesive layer, and wherein one of said substrate forms the back surface of said plurality of lenticules.

75. The lenticular lens array according to claim 60, wherein a conic constant in the range of about −0.25 to about −0.60 defines the elliptical shape.

* * * * *

UNITED STATES PATENT AND TRADEMARK OFFICE
CERTIFICATE OF CORRECTION

PATENT NO. : 6,795,250 B2
DATED : September 21, 2004
INVENTOR(S) : Ralph Barry Johnson and Gary A. Jacobsen It is certified that error appears in the above-identified patent and that said Letters Patent is hereby corrected as shown below:

Title page,
Item [60], Related U.S. Application Data, "Provisional application No. 60/258,931, filed on Dec. 29, 2000, and provisional application No. 60/297,148, filed on Jun. 8, 2001." should read -- Provisional application No. 60/297,148, filed on Jun. 8, 2001. --

Column 13,
Line 51, "substantially" should read -- a substantially --.

Column 15,
Line 32, "shape about" should read -- shape at about --.

Column 16,
Line 41, "array." should read -- array, --.

Column 18,
Line 30, "element" should read -- elements --.
Line 51, "thr" should read -- the --.

Column 19,
Line 10, "coupled said" should read -- coupled to said --.

Column 20,
Line 21, "substrate" should read -- substrates --.

Signed and Sealed this

First Day of February, 2005

JON W. DUDAS
*Director of the United States Patent and Trademark Office*